April 30, 1968 J. W. BRAHAN 3,381,143
ENCAPSULATED ANTI-BOUNCE SWITCH CIRCUIT
Filed Aug. 10, 1964

INVENTOR
JOHN W. BRAHAN
BY [signature]
PATENT AGENT

United States Patent Office 3,381,143
Patented Apr. 30, 1968

3,381,143

ENCAPSULATED ANTI-BOUNCE SWITCH CIRCUIT

John W. Brahan, Ottawa, Ontario, Canada, assignor to Canadian Patents and Development Limited, Ottawa, Ontario, Canada Filed Aug. 10, 1964, Ser. No. 388,538
Claims priority, application Canada, Sept. 10, 1963, 884,187
1 Claim. (Cl. 307—247)

ABSTRACT OF THE DISCLOSURE

An encapsulated anti-bounce switch and circuit arrangement wherein the two output contacts of a single-pole double throw switch are connected to two inputs of a bistable flip-flop circuit such that when the switch is in one position an output is obtained at one output point of the flip-flop and when switched to the other position, the state of the flip-flop changes giving an output at another output point.

This invention relates to an encapsulated anti-bounce circuit and more particularly to an anti-bounce circuit to be employed in conjunction with a single-pole, double-throw switch to eliminate the effects of bounce of the contacts of the switch.

In the electronic computer field, there has been widespread use of single-pole double-throw switches for activating fast computer circuits. These switches have been developed to a high state of reliability and generally speaking perform their function very well. They do, however, suffer from the drawback that the contacts are subject to what is known as "bounce" that is when the switch is operated the contacts strike each other forcibly and rebound to some degree breaking contact. Although the contacts ultimately make good contact, this bouncing often results in incorrect signals passing to subsequent circuitry. In computers where the signals are discrete counts, this switch bouncing which may result in the loss of true counts or the introduction of spurious counts, is very undesirable and often intolerable.

This invention also has application outside the computer field, e.g., switch-operated shaft rotation counters, conveyor speed and travel counters, or anywhere where a switch has a counting function.

I have found that the effects of this switch bouncing can be overcome by feeding the two outputs of a single-pole double-throw switch to the two inputs of bi-stable flip-flop circuit such that when the switch is operated, the outputs of the flip-flop circuit give the desired signal independent of any bouncing that may occur at the contacts of the switch.

In drawings which illustrate an embodiment of the invention,

Figure 1:
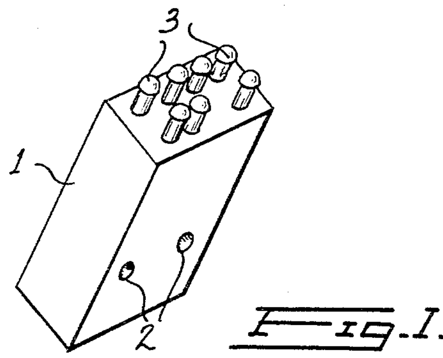
FIGURE 1 is a three-quarter view of the circuit in encapsulated form.

Referring to FIGURE 1, an encapsulated anti-bounce circuit is encapsulated in a suitable potting compound in a mould to form a block-shaped container 1. Posts 3 (seven are shown) connect to the inputs and outputs, and power supply points of the circuit inside the capsule. Holes 2 have been left in the block and are conveniently placed for mounting purposes.

Figure 2:
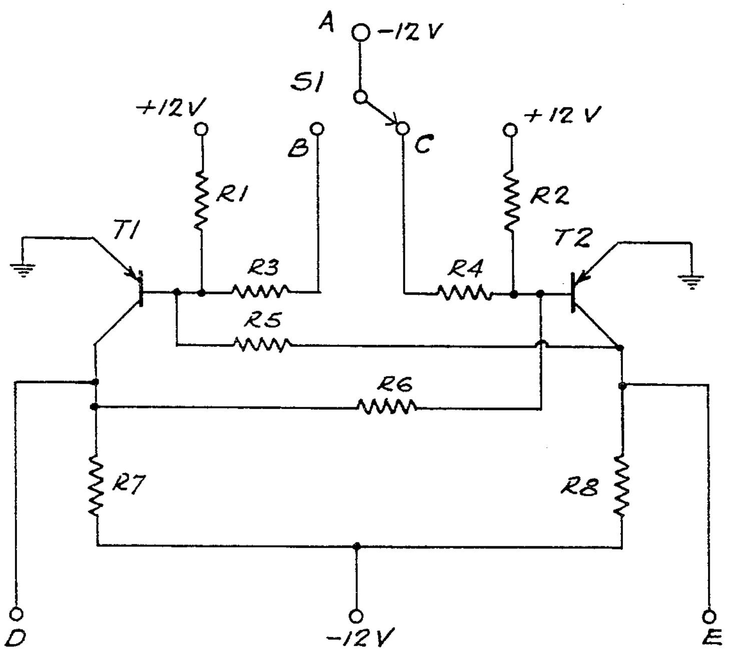
FIGURE 2 is a circuit diagram of the switch and flip-flop circuit.

FIGURE 2 shows a single-pole, double-throw switch S1 having an input point 9 and two output points B and C.

It should be pointed out that invention may be applied to any commercially available switch subject to contact bounce problems. In actual practice the switch used could be mounted on block of FIGURE 1 with the appropriate electrical connections made to posts 3.

The output B and C of the SPDT switch are connected through resistors R3 and R4 to the bases of transistors T1 and T2. The bases of the two transistors are connected through resistors R1 and R2 to a +12 volt D.C. power source. The emitters of the two transistors are grounded. A cross-connection from the collector of transistor T1 is made through a resister R6 to the base of transistor T2 and a similar connection is made from the collector of transistor T2 through a resistor R5 to the base of transistor T1. The collectors of the two transistors are also connected through resistors R7 and R8 to a −12 volt D.C. power source. The output of the circuit is taken at points D and E from the collectors of the transistors.

In operation, when switch S1 is operated e.g. from contact C to B, the flip-flop immediately switches from transistor T2 conducting and transistor T1 cut-off to transistor T1 conducting and transistor T2 cut-off. An output is now obtained at point D rather than at point E. This action takes place immediately first contact is made by the switch contacts. If the contacts bounce, vibrate, or chatter, any erroneous signal that this action might engender is not passed on by the flip-flop circuit which remains in its conducting state. The flip-flop can only return to its original conducting state by the switch being operated back to contact C.

The bi-stable circuit described above is conventional in design and other circuits would suggest themselves to those in the electronic field. Typical components and values for an actual operating circuit are:

| | |
|---|---|
| Transistors: | |
| T1 and T2 | GT1621 |
| Resistors: | |
| R1 and R2 | 100K |
| R3, R4, R5, and R6 | 10K |
| R7 and R8 | 3.9K |

The embodiments of the invention in which an exclusive property or privilege is claimed are defined as follows:

1. An anti-bounce switch circuit comprising:
   (a) a switch having one input and two output contacts,
   (b) a bi-stable flip-flop circuit having a first input point and a second input point and a first output point and a second output point, said circuit adapted to provide an output at the first output point when an input signal is applied to the first input point and to switch states and give an output at the second output point when an input signal is applied to the second input point, and
   (c) connections from the two output contacts of the switch to the two inputs of the bi-stable flip-flop circuit such that when the switch is in one position an output is obtained at the said first output point and when in the other position an output is obtained at the said second output point.

References Cited

UNITED STATES PATENTS

| | | | |
|---|---|---|---|
| 2,663,806 | 12/1853 | Darlington | 307—88.5 |
| 3,324,306 | 6/1967 | Lockwood | 307—88.5 |

JOHN S. HEYMAN, *Primary Examiner.*